July 19, 1955  H. D. WRIGHT  2,713,469
REMOVABLE UTENSIL HANDLE HOLDER
Filed Aug. 15, 1950

INVENTOR
Harold D. Wright
BY R. W. Hodgson
AGENT.

United States Patent Office 2,713,469
Patented July 19, 1955

2,713,469

REMOVABLE UTENSIL HANDLE HOLDER

Harold D. Wright, Huntington Park, Calif.

Application August 15, 1950, Serial No. 179,475

3 Claims. (Cl. 248—229)

The present invention relates generally to a removable utensil handle holder adapted for removable engagement with respect to the edge of a container, such as a cooking kettle, a paint can or the like, for removably supporting a utensil in a selected position with respect to the container. Preferably, though not necessarily, the device of the present invention is arranged to removably engage the handle of a utensil, such as a stirring spoon, a paint brush, or any other manually operable utensil in a virtually upright position spaced from and adjacent to the container wall. Also preferably, though not necessarily, the virtually upright utensil is supported in a spaced adjacent position with respect to the container wall and inside of the container.

Generally speaking, the present invention comprises a removable utensil handle holder adapted for removable engagement with respect to the edge of a container and adapted to removably engage the handle of a utensil for supporting the utensil in a selected position with respect to the container. It includes resilient container engaging means adapted to resiliently slip over the edge of a container to be supported thereon until resiliently removed therefrom. Utensil handle engaging means is carried by the resilient container engaging means in a position for removable, resilient, frictional engagement with the handle of a utensil for supporting the utensil in a selected position with respect to the container until the utensil handle is manually removed from resilient frictional engagement with respect to the utensil handle engaging means.

In a preferred general form of the present invention, the container engaging means is provided with recess means to allow the container engaging means to be slipped over the edge of a flanged container and removably positioned with respect thereto. This recess means may be inwardly directed, outwardly directed, or both, so as to allow the container engaging means to be slipped over the edge of an inwardly flanged container, an outwardly flanged container, or a container having both an inwardly directed and an outwardly directed flange. In a preferred general form of the present invention, the utensil handle engaging means is connected to the container engaging means in a manner such as to be adapted to support the utensil handle in a virtually upright position, laterally spaced from and adjacent to the container edge carrying the container engaging means. It may be positioned within the container or on the outside of the container, although in the preferred form of the present invention it is positioned within the container. In one form of the present invention thermal insulator means is positioned between the heated edge of the container in contact with the container engaging means and the handle of a utensil in resilient engagement with the utensil handle engaging means whereby heat transfer from the container wall to the utensil handle will be minimized.

It is an object of the present invention to provide a novel utensil handle holder adapted for removable engagement with respect to the edge of a container and also adapted to removably engage the handle of a utensil for supporting the utensil in a selected position with respect to the container until it is desired to remove the utensil from said selected position.

A further object of the present invention is to provide a novel removable utensil handle holder adapted for removable engagement with respect to the edge of a container and adapted to removably engage the handle of a utensil for supporting the utensil in a selected position with respect to the container. The device being arranged so as to be capable of removable engagement with an inwardly flanged container edge, an outwardly flanged container edge, a container edge flanged in both inward and outward directions, or an unflanged container edge.

A further object of the present invention is to provide a removable utensil handle holder adapted for removable engagement with respect to the edge of a heated container and adapted to removably engage the handle of a utensil for supporting the utensil in a selected position with respect to the heated container whereby heat transfer into the utensil handle will be minimized to such an extent that the utensil handle will never become uncomfortably hot to the touch. The device is so arranged as to be capable of removable engagement with an inwardly flanged container edge, an outwardly flanged container edge, a container edge flanged in both inward and outward directions, or an unflanged container edge.

Other and allied objects will become apparent to those skilled in the art after a careful perusal, examination and study of the illustrations, specification and appended claims.

To facilitate understanding reference will be made to the hereinabove described drawings in which.

Figure 1:
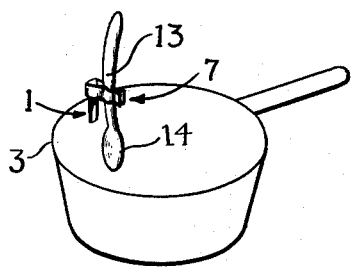
Fig. 1 is a reduced perspective view of one illustrative embodiment of the present invention taking the form of a spoon holder adapted to removably support a stirring spoon within and virtually parallel to the edge wall of a cooking pan.
Figure 3:
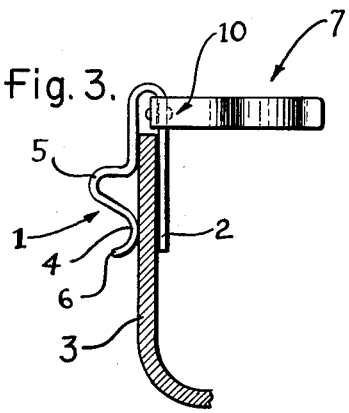
Fig. 3 is a vertical elevation of the spoon holder shown in Fig. 2 (with the spoon removed, however), shown mounted on the edge of one type of cooking kettle, such as the one shown in Fig. 1 (which is in sectional and fragmentary form).
Figure 6:
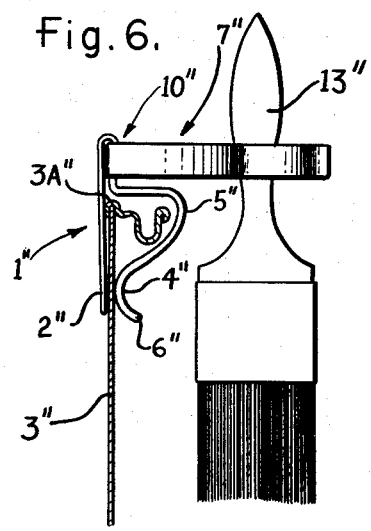
Fig. 6 illustrates in a view, similar in aspect to Figs. 3 and 4, another modified form of the present invention, showing the device supporting a paint brush within a paint can (shown in sectional and fragmentary form).
Figure 4:
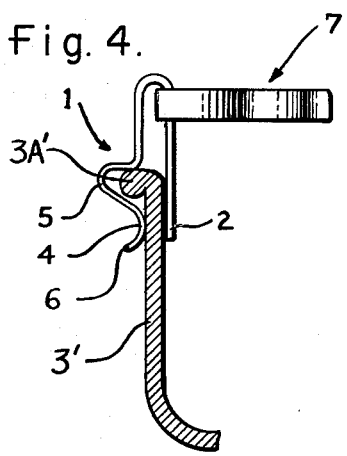
Fig. 4 is a view similar in aspect to Fig. 3, but of a slightly modified form of the present invention adapted to engage an outwardly flanged cooking kettle.
Figure 7:
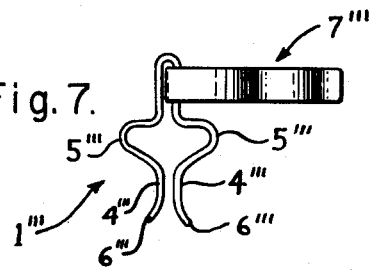

Fig. 7 is an elevation, similar in aspect to Figs. 3, 4, and 6 (without the cans or the kettles, however), of another modified form of the present invention provided with double recess means so as to be capable of making engagement with a straight container edge such as is illustrated in Figs. 1 and 3, an outwardly flanged container edge such as is illustrated in Fig. 4, an inwardly flanged container edge such as is illustrated in Fig. 6, or a container edge both outwardly and inwardly flanged (not illustrated).

More specifically, the present invention includes resilient container engaging means adapted to resiliently slip over the edge of a container and to be supported thereon until removed therefrom. In the specific example illustrated in Figs. 1, 2, 3, and 4, and as best shown in Figs. 3 and 4, the container engaging means is generally indicated at 1, and in the specific example illustrated comprises a spring-like member 2 adapted to make engagement with one side of the container wall 3 (in this case, the inside) and an opposed spring-like member 4 adapted to make resilient engagement with the other side of the container wall 3 (in this case, the outside). In the specific example described and illustrated in Figs. 1, 2, 3, and 4 the outer spring member 4 may be provided with recess means capable of fitting over an outwardly flanged container edge wall, such as is indicated at 3A' at the upper end of the container edge wall 3' in Fig. 4. In the example illustrated in Figs. 3 and 4 the outwardly directed recess means merely comprises a bent, outwardly directed portion, such as is indicated at 5 in the outer spring-like member 4. In the specific example illustrated, the lower end of the spring-like member 4 is outwardly curved as indicated at 6 for the purpose of facilitating the insertion of a cooking kettle or a container edge 3 in Figs. 1 and 3 and 3' in Fig. 4 into engaged position with respect to the container engaging means 1.

Figure 2:
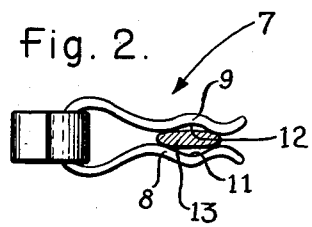
Fig. 2 is a top plan view of the spoon holder shown in Fig. 1 (with the cooking kettle removed, however, and the spoon handle shown in horizontal section).

Connected to the container engaging means is resilient utensil handle engaging means adapted to removably, resiliently, frictionally make engagement with the handle of a utensil for supporting the utensil in a selected position with respect to the container until the utensil handle is manually removed from said frictional engagement with respect to the utensil handle engaging means. In the specific example described and illustrated in Figs. 1, 2, 3, and 4 the utensil handle engaging means is indicated generally at 7 and comprises two spaced opposed resilient members 8 and 9, fastened at 10 with respect to the resilient container engaging means 1 by any suitable type of fastening means, such as riveting, spot welding, or the like, or if desired, under some circumstances they can be integrally fastened. The utensil handle engaging means 7 is so shaped as to conveniently accommodate, receive and make engagement with a utensil handle such as a spoon handle or the like. In order to facilitate this, opposed portions 11 and 12 on the inner sides of the resilient members 8 and 9 are provided, as illustrated in Fig. 2, and effectively engage opposite sides of the handle 13 of a spoon (shown in horizontal section as viewed in Fig. 2).

The operation of the form of the present invention shown in Figs. 1, 2, 3, and 4 may be very briefly described as follows:

The container engaging means 1 is slipped over the edge of an unflanged pan, such as shown in Figs. 1 and 3, or an outwardly flanged pan, such as is shown in Fig. 4. The handle 13 is slipped into the position shown in Fig. 2 in engagement with the opposed spring-like members 8 and 9, forming the utensil handle engaging means 7, thus assuming the general position shown in Fig. 1 with the spoon bowl 14 depending downwardly into the liquid contained in the pan and with the handle 13 extending upwardly above the top of the pan in virtually parallel spaced relationship with respect to the container edge 3 and within the horizontal area of the container or cooking pan. Preferably, the resilient spring-like members 8 and 9, comprising the utensil handle holding means, support the spoon so that the bowl 14 does not touch the bottom of the pan 3. However, the present invention is not limited to this arrangement, since I have found that under some circumstances the handle 13 will not become uncomfortably hot if the tip of the spoon bowl does touch the bottom of the cooking pan. The spoon can remain in the position shown in Fig. 1 while the liquid in the pan 3 is heated, and whenever the liquid needs to be stirred, the spoon can be removed from engagement with respect to the utensil handle engaging means 7 and can be used for stirring the liquid. The spoon handle 13 can then be replaced in the position shown in Fig. 1 until further stirring of the liquid contained in the pan is needed.

Figure 5:
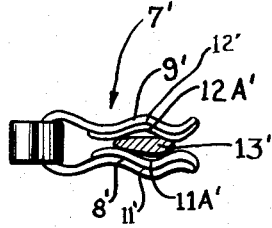
Fig. 5 illustrates in top plan view, similar in aspect to Fig. 2, a slightly modified form of the present invention, including thermal insulator means.

Fig. 5 illustrates a slightly modified form of the present invention, and corresponding parts will be indicated by similar reference numerals primed. This particular form of the present invention is one embodiment of a generic form of the present invention wherein thermal insulator means is provided in order to minimize heat transfer from the container edge wall through the container engaging means and the utensil handle engaging means to the utensil or spoon handle. In the particular form illustrated in Fig. 5 the thermal insulator means take the form of pads 11A' and 12A' positioned in the curved portions 11' and 12' in the opposed resilient spring members 8' and 9', comprising the utensil handle engaging means 7', and are adapted to make engagement with the exterior of a spoon handle 13'.

It should be noted that the thermal insulator pads 11A' and 12A' effectively minimize heat transfer from the utensil handle engaging means to the utensil handle, and in addition, if they are of relatively resilient, frictional composition, such as a plastic or the like, they also aid in immobilizing the spoon by reason of the effective frictional contact with the spoon handle 13'. The thermal insulator pads 11A' and 12A' may be formed of any suitable material; for example, "Silicone" rubber, or various others of the organo-silicons, "Teflon," or various others of the fluoro-carbons, or various other suitable materials having the proper heat resistant and/or resilient and/or frictional characteristics may be employed.

Fig. 6 illustrates another slightly modified form of the present invention, and similar parts will be indicated by similar reference numerals doubly primed. In this case the resilient utensil handle engaging means 7" is adapted to make engagement with the handle 13" of a paint brush and support it within a can of paint, so that excess paint will drip back into the can and the paint brush will be in an accessible, readily removable position where it is not likely to stain objects or areas which are not intended to be painted or stained, such as frequently occurs when a paint brush is laid down after temporary cessation of a painting operation. In this particular form of the present invention, the resilient utensil handle engaging means 7" is suitably fastened as indicated at 10" to the upper end of the container edge or wall engaging means 1" in a manner similar to that shown in the hereinbefore described forms of the present invention. However, in this particular form of the present invention, the outer spring-like member 2" is virtually straight since the paint can or container wall 3" is not outwardly flanged, but is instead inwardly flanged as indicated at 3A". To compensate for this, the inner resilient spring-like member 4" is inwardly recessed as indicated at 5" so that the container edge wall engaging means 1" can be slipped over the can wall 3" and the inwardly directed flange 3A" into the position shown in Fig. 6.

In this particular form of the present invention, the resilient spring-like means 4", adapted to engage the inside of the can wall 3", is provided at its lower end with a curved lip 6" in order to facilitate the engaging operation of the container edge wall engaging means 1" by slipping it over the flange 3A" and the wall 3".

Fig. 7 illustrates another slightly modified form of the present invention, similar to those hereinbefore described and illustrated, except that both an outwardly directed recess 5''', similar to that shown in the form of the invention illustrated in Figs. 1, 2, 3, and 4, and an inwardly directed recess 5''', similar to that shown in Fig. 6, are employed so that the container engaging means 1''' can engage or slip over a straight wall, such as that shown in Figs. 1 and 3, an outwardly flanged wall, such as that shown in Fig. 4, an inwardly flanged wall, such as that shown in Fig. 6, or both an outwardly and an inwardly flanged wall (not shown, since a combination of Figs. 5 and 6 would produce such an outwardly and inwardly flanged wall). The balance of the modified form of the present invention shown in Fig. 7 is similar to that hereinabove described, and similar parts will be indicated by the similar triply primed reference numerals 4''', 5''', and 7'''.

It should be understood that while in the preferred forms of the present invention the container engaging means and the utensil handle engaging means are preferably made of resilient metallic material, I do not limit myself to such material, since any desired type of material having the proper characteristics (heat resisting) can be employed. For example, the entire device or certain portions thereof may be made of a suitable plastic material. If desired, parts of the device may be made of metallic material and other parts made of a suitable plastic material (which may also act as a thermal insulator, if desired). In this connection it should also be noted that the upper end of the spoon handle 13 may, if desired, be of thermal, non-conductive material in certain cases, such as the hereinbefore mentioned examples where liquids having a boiling temperature substantially above 212 degrees are being heated. In such cases, it will not be necessary to provide any thermal insulator means in the utensil engaging means or the container engaging means. Of course, under ordinary circumstances when heating water-containing liquids, such thermal insulation is not usually necessary.

It should be noted that the exact composition, configuration shape, structure and relationship of the component parts of the present invention may be modified substantially within the spirit and scope hereof. It should also be noted that the method of fabricating the device of the present invention may vary within wide limits and the device itself may be of integral or non-integral construction. It should also be noted that while I have referred to the container engaging means and/or the utensil handle engaging means as being of resilient construction, they are not necessarily limited to an arrangement whereby the opposed members actually resiliently engage the opposite sides of the edge wall of a container and/or a utensil handle. All that is necessary is that sufficient resiliency be possessed by the container engaging means to allow it to be slipped over a flanged container edge. If the container is not flanged, no resiliency is necessary. Once it is in position on the edge of the container, it will maintain said position under the influence of gravity, and resilient engagement of opposed walls of the container edge is not necessary. This is also true of the utensil handle engaging means.

The embodiments of the present invention described and illustrated herein are exemplary only and are not intended to limit the scope of the present invention which is to be interpreted in the light of the prior art and the appended claims only with due consideration for the doctrine of equivalents.

I claim:

1. A removable utensil handle holder adapted for removable engagement with respect to the edge of a container and adapted to removably engage the handle of a utensil for supporting the utensil in a selected position with respect to the container, comprising: container engaging means having a first substantially straight downwardly directed container engaging finger adapted to abut and engage one surface of a container wall and having a second laterally spaced container engaging finger provided with an upper virtually downwardly directed container engaging portion, a lower curved container engaging portion, and a recessed portion connecting said upper and lower portions, said upper and lower portions being positioned to engage the opposite surface of the container wall from the first finger, and said recessed portion being recessed in a direction away from the first finger to allow the container engaging means to be slipped over the edge of a flanged container and be removably positioned with the recessed portion of the second finger in encompassing relationship with respect to the container flange, said container engaging means including a bight portion at the top thereof connecting said first and second container engaging fingers; and utensil handle engaging means carried by the container engaging means adjacent the top thereof in a laterally projecting position for removable engagement with the handle of a utensil for supporting the utensil in a selected position with respect to the container until the utensil handle is manually removed from engagement with respect to the utensil handle engaging means, said utensil handle engaging means being of U-shaped bifurcated configuration having two laterally directed adjacent resilient handle-engaging members connected at similar ends by a bight portion disposed in the bight portion of the container engaging means.

2. A removable utensil handle holder adapted for removable engagement with respect to the edge of a container and adapted to removably engage the handle of a utensil for supporting the utensil in a selected position with respect to the container, comprising: container engaging means having an inner substantially straight downwardly directed container engaging finger adapted to abut and engage the inner surface of a container wall and having an outer laterally spaced container engaging finger provided with an upper virtually downwardly directed container engaging portion, a lower curved container engaging portion, and an outwardly curved recessed portion connecting said upper and lower portions, said upper and lower portions being positioned to engage the outer surface of the container wall opposite said inner finger, and said outwardly recessed portion being positioned to allow the container engaging means to be slipped over the outwardly directed edge of a flanged container and to be removably positioned with the recessed portion in encompassing relationship with respect to the container flange, said container engaging means including a bight portion at the top thereof connecting said first and second container engaging fingers; and utensil handle engaging means carried by the container engaging means adjacent the top thereof in an inwardly laterally projecting position for removable engagement with respect to the handle of a utensil for supporting said utensil handle in a virtually upright position, laterally spaced from the container edge carrying the container engaging means and within the container, said utensil handle engaging means being of U-shaped bifurcated configuration having two inwardly directed adjacent resilient handle-engaging members connected at their outer ends by a bight portion disposed in the bight portion of the container engaging means.

3. A removable utensil handle holder adapted for removable engagement with respect to the edge of a container and adapted to removably engage the handle of a utensil for supporting the utensil in a selected position with respect to the container, comprising: container engaging means having an outer substantially straight downwardly directed container engaging finger adapted to abut and engage the outer surface of a container wall and having an inner laterally spaced container engaging finger provided with an upper virtually downwardly directed container engaging portion, a lower curved container engaging portion, and an inwardly curved recessed portion connecting said upper and lower portions, said upper and lower portions being positioned to engage the inner surface of the container wall opposite said outer finger, and said inwardly recessed portion being positioned to allow the container engaging means to be slipped over the inwardly directed edge of a flanged container and to be removably positioned with the recessed portion in encompassing relationship with respect to the container flange, said container engaging means including a bight portion at the top thereof connecting said first and second container engaging fingers; and utensil handle engaging means carried by the container engaging means adjacent the top thereof in an inwardly laterally projecting position for removable engagement with respect to the handle of a utensil for supporting said utensil handle in a virtually upright position, laterally spaced from the container edge carrying the container engaging means and within the container, said utensil handle engaging means being of U-shaped bifurcated configuration having two inwardly directed horizontally adjacent resilient handle-engaging members connected at their outer ends by a bight portion disposed in the bight portion of the container engaging means.

References Cited in the file of this patent

UNITED STATES PATENTS

| | | | |
|---|---|---|---|
| 148,355 | Dennett | Mar. 10, | 1874 |
| 568,121 | Varian | Sept. 22, | 1896 |
| 574,145 | Gannon | Dec. 29, | 1896 |
| 1,201,001 | Thomas | Oct. 10, | 1916 |
| 1,333,616 | Hall et al. | Mar. 16, | 1920 |
| 2,454,474 | Nance | Nov. 23, | 1948 |
| 2,478,808 | Deal | Aug. 9, | 1949 |